United States Patent
Gertitschke et al.

(10) Patent No.: US 9,216,834 B2
(45) Date of Patent: Dec. 22, 2015

(54) METHOD FOR INSERTING COTTON WADS INTO CONTAINERS

(75) Inventors: Detlev Gertitschke, Laupheim (DE); Michael Kronawitter, Beimerstetten (DE)

(73) Assignee: Uhlmann Pac-Systeme GmbH & Co. KG, Laupheim (DE)

(*) Notice: Subject to any disclaimer, the term of this patent is extended or adjusted under 35 U.S.C. 154(b) by 664 days.

(21) Appl. No.: 13/572,155

(22) Filed: Aug. 10, 2012

(65) Prior Publication Data
US 2013/0061560 A1    Mar. 14, 2013

(30) Foreign Application Priority Data
Sep. 13, 2011    (EP) .................................... 11181042

(51) Int. Cl.
*B65B 61/22*   (2006.01)
*B65G 47/84*   (2006.01)

(52) U.S. Cl.
CPC ............... *B65B 61/22* (2013.01); *B65G 47/846* (2013.01)

(58) Field of Classification Search
CPC ....... B65B 61/22; B65G 47/84; B65G 47/846
USPC .................. 198/459.2; 53/115, 473
See application file for complete search history.

(56) References Cited

U.S. PATENT DOCUMENTS

| | | | |
|---|---|---|---|
| 2,412,089 A * | 12/1946 | Kelly | 53/435 |
| 2,805,531 A | 9/1957 | Dimond | |
| 2,810,245 A | 10/1957 | Dimond | |
| 3,030,748 A | 4/1962 | Moses | |
| 3,031,350 A | 4/1962 | Foster | |
| 6,354,427 B1 * | 3/2002 | Pickel et al. | 198/470.1 |
| 6,598,368 B1 * | 7/2003 | Haida | 53/115 |
| 6,775,957 B2 * | 8/2004 | Chen et al. | 53/438 |
| 2008/0230348 A1 * | 9/2008 | Damen | 198/459.2 |

FOREIGN PATENT DOCUMENTS

GB    736979 A    9/1955

OTHER PUBLICATIONS

EP Search Report for EP 11181042 dated Jan. 30, 2012.

* cited by examiner

*Primary Examiner* — Thanh Truong
*Assistant Examiner* — Patrick Fry
(74) *Attorney, Agent, or Firm* — Brinks Gilson & Lione

(57) ABSTRACT

The method for inserting cotton wads into containers uses a wad transport unit, which comprises two star wheels, each having three wad holders. The two star wheels are mounted rotatably on the same rotational axis but with an offset from each other, and each star wheel is driven by its own separate drive means. During rotation of the star wheels, one of the three wad holders of each star wheel is horizontally shifted in such a way that the three wad holders of each star wheel are arranged in a straight line and are thus located above three containers to be filled with the wads.

13 Claims, 3 Drawing Sheets

METHOD FOR INSERTING COTTON WADS INTO CONTAINERS

RELATED APPLICATIONS

The present patent document claims the benefit of priority to European Patent Application No. EP 11181042.0, filed Sep. 13, 2011, and entitled "METHOD FOR INSERTING COTTON WADS INTO CONTAINERS" the entire contents of each of which are incorporated herein by reference.

FIELD AND BACKGROUND OF THE INVENTION

The invention relates to a method for inserting cotton wads into containers.

In the pharmaceutical industry, pharmaceutical products are often packaged in bottle-shaped or can-shaped containers. Before the containers are sealed, cotton wads or strands are often laid on the products to protect them. This is the usual practice especially in cases of partially filled containers. Because the cotton strands can be very long when the volume to be filled is large, the length of the stroke required to insert the cotton wads can also

BRIEF SUMMARY

It is an object of the present invention to provide a method for inserting cotton wads into containers by means of which it is possible to achieve fast cycle times while ensuring at the same time that the containers are filled reliably.

According to an aspect of the invention, the method for inserting cotton wads into containers comprises the following steps:
  providing a wad transport unit, which comprises at least two star wheels, each with at least three wad holders, wherein the at least two star wheels are mounted rotatably on the same rotational axis but with an offset from each other, and wherein each star wheel is driven by its own separate drive means;
  rotating the at least two star wheels in cycles, wherein a wad is supplied to each wad holder in a wad-receiving position, and wherein each wad holder provided with a wad is moved onward to a wad-ejecting position;
  providing at least three containers at a time during each cycle, the containers being arranged in a straight line and at least partially filed with products;
  horizontally shifting at least one of the at least three wad holders of each star wheel during the rotation of the star wheel in such a way that the at least three wad holders of each star wheel, when in their wad-ejecting position, are arranged in a straight line; and
  transferring the wads held by the at least three wad holders into the at least three provided containers while the wad holders are in their wad-ejecting positions.

By means of this method, it is possible to fill containers with cotton wads at a fast cycle rate, wherein reliable operation can be achieved at the same time with little risk of breakdown.

Each wad holder is preferably moved along a curved path in the area of its wad-receiving position. The curved path is preferably a certain part of a circle. With this geometry, the wad-receiving positions can be easily reached by rotation of the entire star wheel without the need for any additional help.

In a preferred embodiment, only one wad-receiving position is provided for all of the wad holders, and each wad holder is provided with a wad in this one wad-receiving position. It is true that this imposes greater requirements on the speed and on the drive of the star wheels, but limiting the process to one filling position reduces the complexity of the mechanism required to "fill" each wad holder.

The horizontal shifting of the at least one wad holder is preferably carried out by positively driven mechanical means. In this way, the wad holders can be brought into a linear arrangement when in their wad-ejecting position without the need for an additional drive.

In an especially preferred embodiment, the wad transport unit comprises a stationary cam disk, on which a roller is guided, which is connected to the wad holder to be shifted, and it also comprises a spring element, which holds the roller against the cam disk. Thus the wad holder to be shifted is easily brought into the desired position merely by the rotation of the star wheel.

The cam disk is preferably designed as a circular disk, which is offset eccentrically from the rotational axis of the star wheels. Even with a design as simple as this, it is possible to arrange the wad holders in a straight line in the area of the wad-ejecting positions, whereas the wad holders are in a non-linear arrangement with respect to each other in the area of the wad-receiving positions.

To simplify the support, the wad holder to be shifted can be mounted on an arm, which is itself pivotably supported on a rigid arm of one of the other wad holders of the same star wheel.

Optimal use of the capacity of the claimed method is achieved when the wads held by the at least three wad holders are transferred simultaneously into the at least three provided containers when the wad holders are in their wad-ejecting positions.

Servomotors are preferably used as the separate drive means so that the speeds of the star wheels can be adjusted in a highly precise and load-tolerant manner.

In a preferred embodiment, both star wheels pass along the same speed curve but with an offset from each other in time, wherein the speed of a star wheel is zero whenever it is receiving or ejecting a wad. This means that the overall system performs a uniform set of movements, which therefore makes it easy to program the individual drive means.

In an especially preferred embodiment, the wad transport unit comprises exactly two star wheels, each of which comprises exactly three wad holders. In this case only the middle or second of the three wad holders of each star wheel is shifted horizontally toward the wad-ejecting position. In this way, it is especially easy to bring the three wad holders of each star wheel into a straight line when in their wad-ejecting positions.

In this case, it is preferable, when the wad holders are in the area of the wad-receiving position, for the angular distance between the first and the second wad holder of a star wheel to be different from the angular distance between the second and the third wad holder of the star wheel. In other words, an asymmetric arrangement of the wad holders is therefore created in the area of their wad-receiving positions, which is converted into a symmetrical arrangement of the wad holders in the area of their wad-ejecting positions by the pivoting of the middle wad holder.

BRIEF DESCRIPTION OF THE DRAWINGS

Additional advantages and features of the present invention can be derived from the following description, which refers to the drawings.

DETAILED DESCRIPTION OF SPECIFIC EMBODIMENTS

Figure 1:
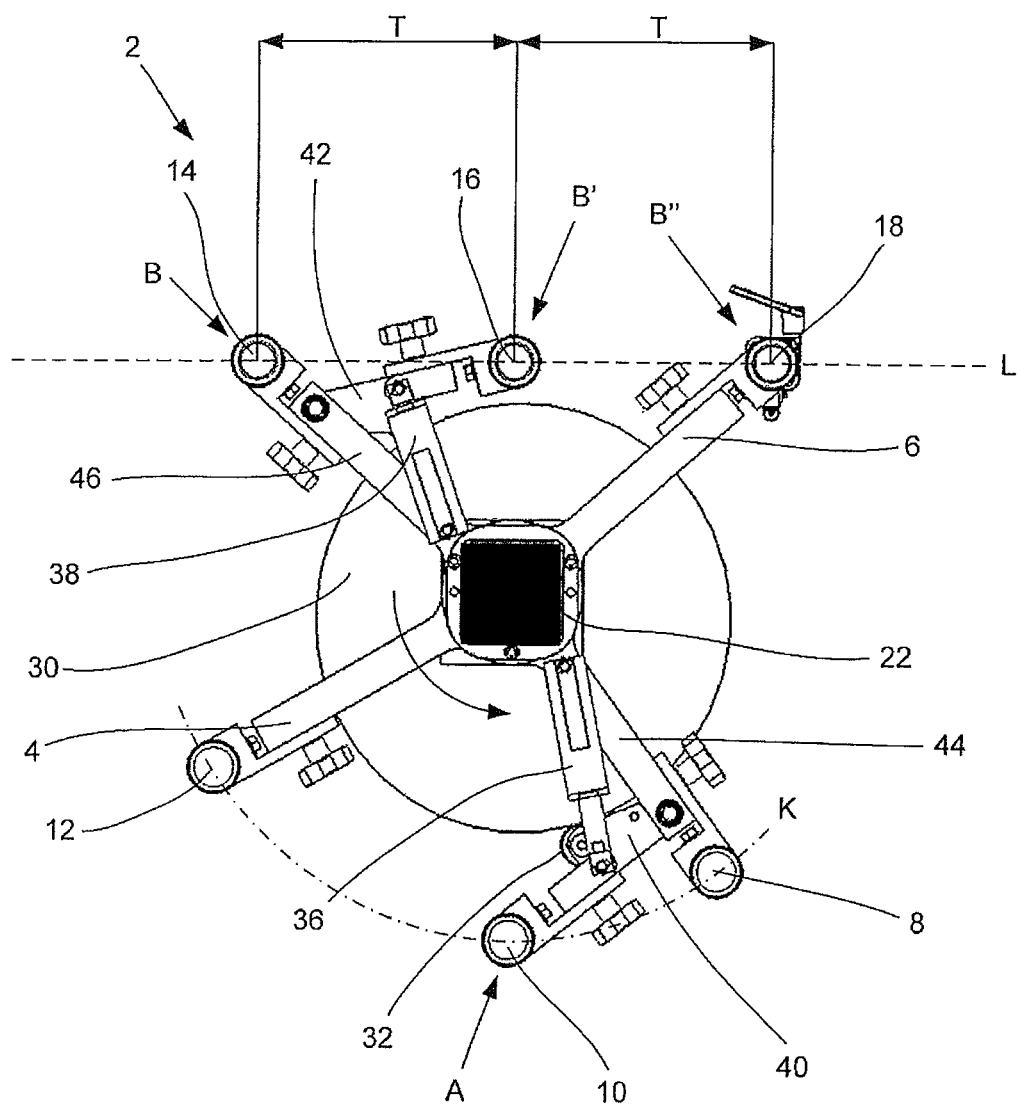
FIG. 1 is a view from below of an embodiment of a wad transport unit by means of which the method according to the invention can be carried out.
Figure 2:
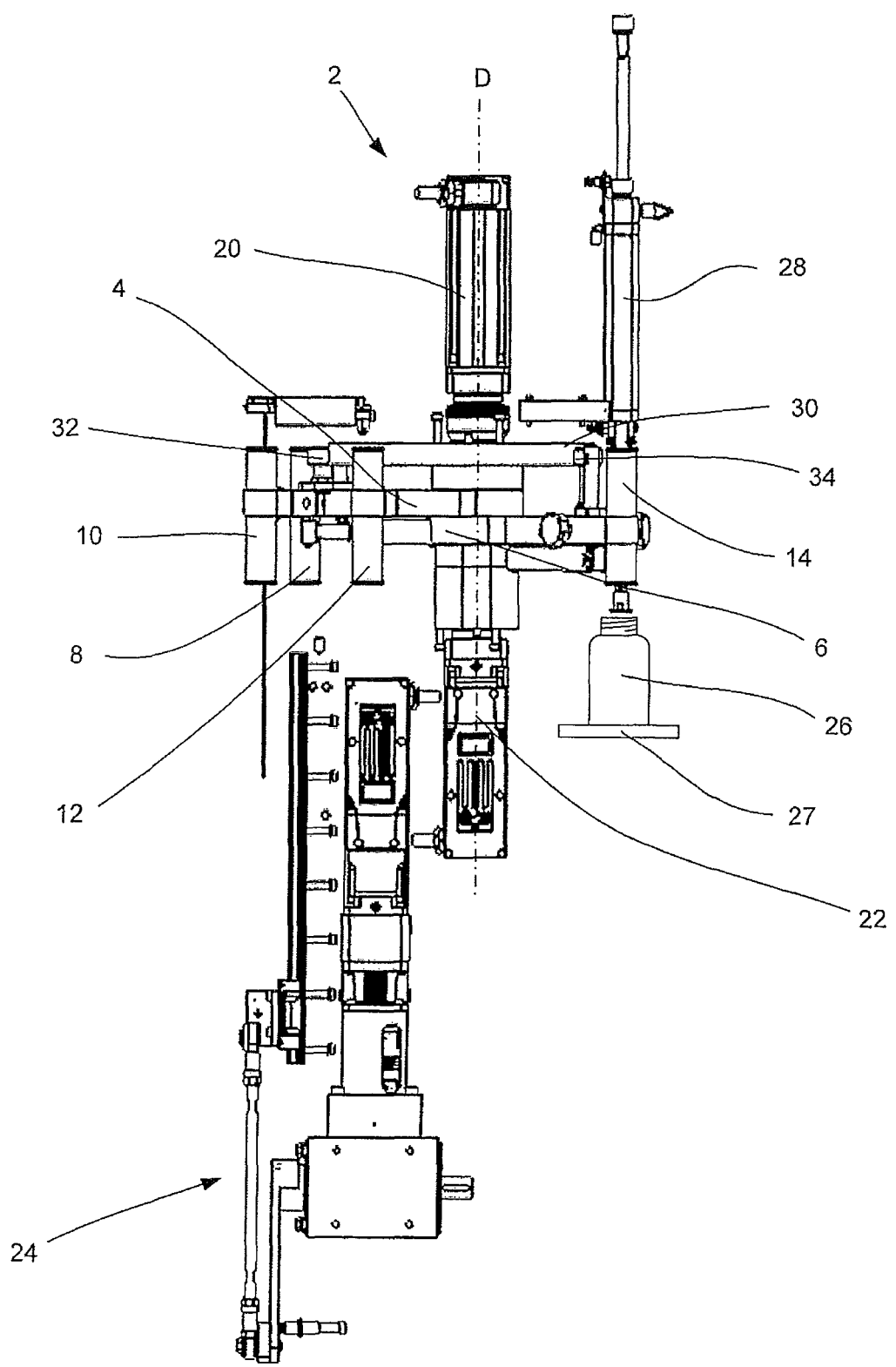
FIG. 2 is a front view of the wad transport unit of FIG. 1 with appropriate devices for loading and unloading the wad holders.

FIGS. 1 and 2 show an embodiment of a wad transport unit 2 from below and from the front, respectively. This unit can be used for the insertion of cotton wads or strands into containers according to the invention. In the example shown here, the wad transport unit 2 comprises a first star wheel 4 and a second star wheel 6, both of which rotate around the same rotational axis D (FIG. 2) in the direction of the arrow (FIG. 1). More than two star wheels 4, 6 could also be provided.

The first star wheel 4 comprises three wad holders 8, 10, 12, which are arranged a certain distance apart, wherein the two outer wad holders 8, 12 enclose an angle of 90-110°. The second star wheel 6 also comprises three wad holders 14, 16, 18, which are again arranged a certain distance apart, wherein the two outer wad holders 14, 18 enclose an angle of 90-110°. More than three wad holders per star wheel 4, 6 could also be provided, and the angles formed by the two outer wad holders can also be larger or smaller than the indicated range.

In the embodiment shown here, all of the wad holders 8, 10, 12, 14, 16, 18 are designed as small tubes, into which cotton wads (not shown) are inserted for further transport and out of which the wads are then also ejected. There are also many other conceivable shapes which the wad holders 8, 10, 12, 14, 16, 18 could have, these being known from the prior art. The first star wheel 4 and the second star wheel 6 are driven by separate drive means 20, 22. The drive means 20, 22 are preferably servomotors, one of them projecting upward, the other downward, from the two star wheels 4, 6, as can be seen in FIG. 2.

During operation of the wad transport unit 2, a wad is supplied to each wad holder 8, 10, 12, 14, 16, 18 at an associated wad-receiving position A by means of a crank drive 24, shown in FIG. 2 by way of example. There are many known mechanisms for inserting cotton wads or strands into the wad holders 8, 10, 12, 14, 16, 18. These mechanisms will not be described here in detail, but any one of them can be used. In the example shown here, the same wad-receiving position A is used for all of the wad holders 8, 10, 12, 14, 16, 18. In other words, each of the six wad holders 8, 10, 12, 14, 16, 18 of the two star wheels 4, 6 must come to a stop each time at this same point A so that they can be filled in this position by the same device. It would also be possible for various wad-receiving positions A to be present for the various wad holders. In this case, it would be necessary to have several parallel feed devices for inserting the cotton wads into the wad holders.

In the area of the wad-receiving position A, each wad holder 8, 10, 12, 14, 16, 18 is moved along a curved path, preferably a certain part K of a circle. In the area of the wad-receiving position A and around this position, the angular distance between the first wad holder 8 and the second wad holder 10 of the first star wheel 4 is different from the angular distance between the second wad holder 10 and the third wad holder 12 of the first star wheel 4. The same is also true for the wad holders 14, 16, 18 of the second star wheel 6. Nevertheless, all three wad holders 8, 10, 12 are located on the same part K of a circle. The same applies to the wad holders 14, 16, 18 of the second star wheel 6.

Each of the two star wheels 4, 6 is therefore rotated in cycles, wherein a wad is supplied to each wad holder 8, 10, 12, 14, 16, 18 in the wad-receiving position A, after which each of the wad holders 8, 10, 12, 14, 16, 18, now holding a wad, is moved onward to a wad-ejecting position B, B', B". While the star wheel 4, 6 remains stopped, the wads held in the wad holders 8, 10, 12, 14, 16, 18 are introduced into three provided containers 26 while the wad holders 8, 10, 12, 14, 16, 18 are in the wad-ejecting positions B, B', B". The number of wad-ejecting positions B, B', B" and of containers 26 is obviously variable and will correlate with the number of wad holders 8, 10, 12; 14, 16, 18 of a star wheel 4, 6. In the preferred embodiment shown here, the same wad-ejecting positions B, B', B" are used for the wad holders of both star wheels 4, 6.

At the time the cotton wads are inserted, the containers 26 are usually filled at least partially with pharmaceutical products and are arranged in a straight line. They are conducted in an upright position past the wad-ejecting positions B, B', B" in cycles by a transport device 27, such as a conveyor belt, a chain, or some other known type of transport means, not described in detail here. The wads are preferably transferred simultaneously into the provided containers 26 at all three wad-ejecting positions B, B', B". In the example shown here, this is done by means of three pneumatic cylinders 28, which push the cotton wads down out of the wad holders 8, 10, 12, 14, 16, 18 and into the containers 26. The important point here is that the three wad holders 14, 16, 18 or 8, 10, 12 of the associated star wheel 4 or 6 are arranged in a straight line when they are in their wad-ejecting positions B, B', B". The straight line formed by the three wad-ejecting positions B, B', B" is indicated in FIG. 1 by the letter "L". In these positions, the distance T between the three wad holders 14, 16, 18 or 8, 10, 12 is the same as that between the containers 26 located underneath them.

To achieve this, the middle (second) wad holder 10, 16 of each star wheel 4, 6 is shifted horizontally, i.e., inwardly in the present example, during the rotation of the star wheel 4, 6 toward its wad-ejecting position B' in such a way that the linear alignment of the three wad holders 8, 10, 12 or 14, 16, 18 along line L is achieved for the transfer of the wads to the containers 26. This horizontal shifting can also involve another wad holder or several wad holders, especially in cases where more than three wad holders per star wheel 4, 6 are provided.

In the example shown here, the horizontal shifting of the second wad holder 10, 16 is achieved by positively driven mechanical means. Other possible designs for shifting the holders horizontally are also conceivable. In the example shown here, the positive mechanical guidance is produced by a stationary cam disk 30, the inner curved section or inner dead-point position of which lies in the area of the wad-ejecting positions B, B', B", whereas the outer curved section or outer dead-point position lies in the area of the wad-receiving position A. In other words, the cam disk 30 is designed as a circular disk, which is offset eccentrically from the rotational axis D of the star wheels 4, 6. A roller 32, 34, which is connected to the wad holder 10, 16 to be shifted, is guided along this cam disk 30. A spring element 36, 38 holds or presses the corresponding roller 32, 34 against the cam disk 30. It is obvious that the cam disk 30 could also be designed in other ways.

In the design embodiment shown here, the wad holder 10, 16 to be shifted is arranged on an arm 40, 42, which is supported pivotably on a rigid arm 44, 46 of one of the other wad holders. In the present case, this other wad holder is the first wad holder 8, 14 of the associated star wheel 4, 6. The pivot axis of the arm 40, 42 around the rigid arm 44, 46 lies radially outside the circumference of the cam disk 30. One end of the spring element 36, 38 is connected to the associated pivotable arm 40, 42, whereas the other end is connected to the rigid arm 44, 46 near the rotational axis D of the star wheels 4, 6. The spring element 36, 38 thus pulls the pivotable arm 40, 42 inward against the lateral surface of the cam disk 30. Because of the eccentricity of the cam disk 30, the pivotable arm with the middle wad holder 10, 16 is therefore pivoted inward in the area of the wad-ejecting position B' (so that the middle wad holder 10, 16 forms a straight line L with the other two wad holders 8, 12; 14, 18), whereas, in the area of the wad-receiving position A, it is pivoted outward (so that the middle wad holder 10, 16 is thus arranged along part K of a circle together with the other two wad holders 8, 12; 14, 18 of the associated star wheel 4, 6).

Figure 3:
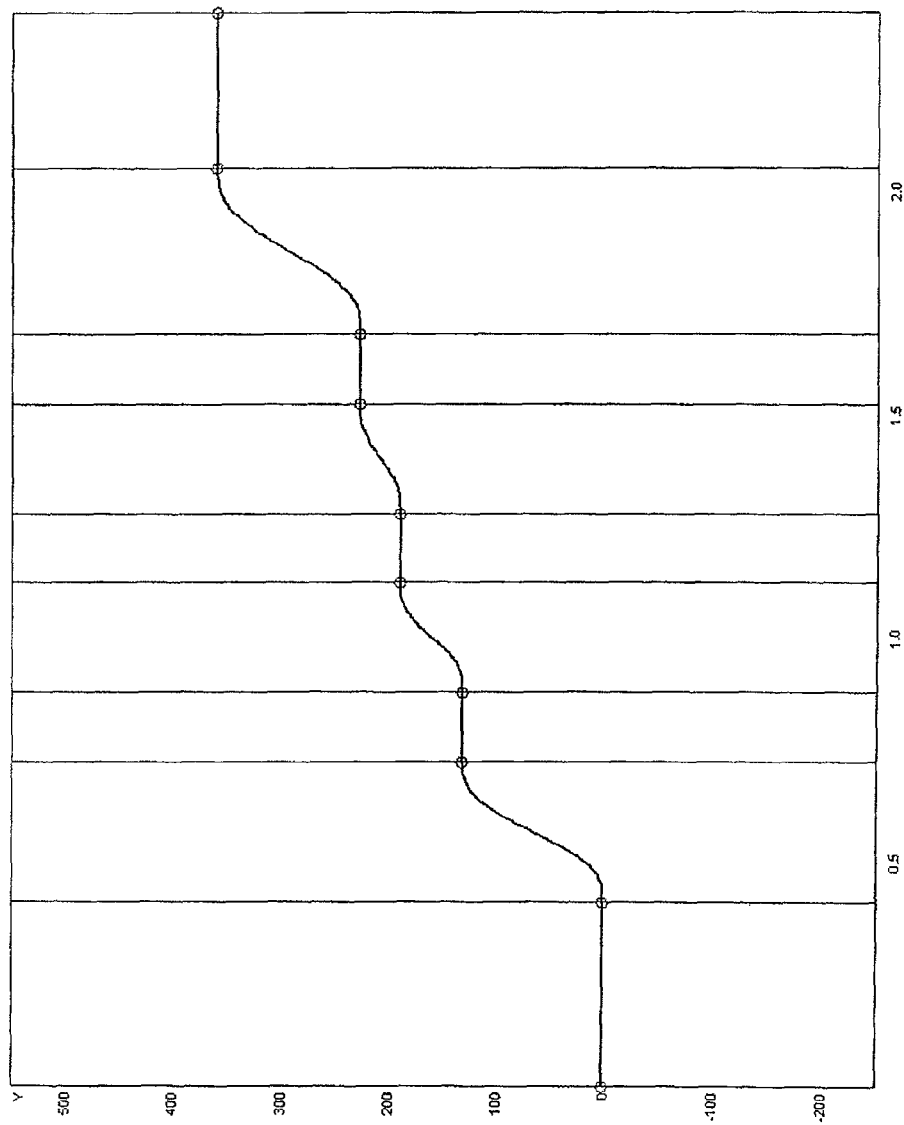
FIG. 3 shows a graph of the speed of the star wheels of the wad transport unit of FIG. 1 during one revolution around the rotational axis.

FIG. 3 shows a possible curve of the rotational angle (rotational angle Y versus time t) for a star wheel 4, 6 during one revolution in the transport direction of the containers. Each star wheel 4, 6 passes along the same rotational angle curve with a certain time offset between them. The offset is preferably equal to half the duration of one cycle. It is easy to see that the angular speed of the star wheel 4, 6 is zero during the wad-receiving process (see the three small plateaus in the middle) and during the wad-ejecting process (see the large plateau extending from the upper right to lower left), as a result of which the rotational angle Y remains unchanged, whereas various rotational angle profiles (so-called "dwell-in-dwell" motion profiles) are present between the associated stop points or dwell points. The rotational angle curves of the star wheels 4, 6, could differ from the profile shown here, in which case the number and form of the star wheels 4, 6, the number and arrangement of the wad holders 8, 10, 12, 14, 16, 18, the number and arrangement of wad-receiving positions A, and the arrangement of the wad-ejecting positions B, B', B" would have to be taken into consideration.

The invention claimed is:

1. A method for inserting cotton wads into containers comprising the steps of:
   providing a wad transport unit, which comprises at least two star wheels, each comprising at least three wad holders, wherein the at least two star wheels are mounted rotatably on a same rotational axis but with an offset from each other, and wherein each of the at least two star wheels is driven by its own separate drive means;
   rotating the at least two star wheels in cycles, wherein a wad is supplied to each wad holder in a wad-receiving position, and wherein each wad holder provided with a wad is moved onward to a wad-ejecting position;
   providing at least three containers at a time during each cycle, the containers being arranged in a straight line and at least partially filled with products;
   horizontally shifting at least one of the at least three wad holders of each star wheel during the rotation of the star wheel in such a way that the at least three wad holders of each star wheel, when in their wad-ejecting positions, are arranged in a straight line; and
   simultaneously transferring the wads held by the at least three wad holders into the at least three provided containers while the wad holders are in their wad-ejecting positions and are thus arranged in a straight line.

2. The method of claim 1, wherein each wad holder is moved along a curved path in the area around its wad-receiving position.

3. The method of claim 2, wherein the curved path is a part of a circle.

4. The method of claim 1, wherein only one wad-receiving position is provided, and each wad holder is provided with a wad at this one wad-receiving position.

5. The method of claim 1, wherein the horizontal shifting of the at least one wad holder is carried out by positively driven mechanical means.

6. The method of claim 5, wherein the wad transport unit comprises a stationary cam disk, on which a roller connected to the wad holder to be shifted is guided, and wherein a spring element holds the roller against the cam disk.

7. The method of claim 6, wherein the cam disk is designed as a circular disk, which is offset eccentrically from the rotational axis of the at least two star wheels.

8. The method according to claim 7, wherein the wad holder to be shifted is mounted on an arm, which is supported pivotably on a rigid arm of one of the other wad holders of the same star wheel.

9. The method of claim 1, wherein, when the at least three wad holders are in their wad-ejecting positions, the wads held in them are transferred simultaneously into the at least three provided containers.

10. The method of claim 1, wherein the separate drive means are servomotors.

11. The method of claim 1, wherein each of the at least two star wheels travels along a same speed curve but with an offset in time from the other of the at least two star wheels, wherein the speed of each of the at least two star wheels is zero at the wad-receiving position and at the wad-ejecting position.

12. The method of claim 1, wherein the wad transport unit has exactly two star wheels, each of which having exactly three wad holders, and wherein only a middle or second of the three wad holders of each star wheel is shifted horizontally toward its wad-ejecting position.

13. The method of claim 12, wherein, in an area of the wad-receiving position, an angular distance between a first and the second wad holder of a star wheel is different from an angular distance between the second and a third wad holder of the star wheel.

* * * * *